United States Patent [19]

Kubota

[11] Patent Number: 4,717,208
[45] Date of Patent: Jan. 5, 1988

[54] BRAKE PRESSURE CONTROL VALVE OF A DOUBLE PIPING HYDRAULIC BRAKING SYSTEM

[75] Inventor: Hitoshi Kubota, Minamiashigara, Japan

[73] Assignee: Nissan Motor Co., Ltd., Yokohama, Japan

[21] Appl. No.: 619,198

[22] Filed: Jun. 11, 1984

[30] Foreign Application Priority Data

Jun. 20, 1983 [JP] Japan ................... 58-110411

[51] Int. Cl.$^4$ ................... B60T 13/74; B60T 11/00
[52] U.S. Cl. ................... 303/6 C; 188/349; 303/6 R
[58] Field of Search ................... 303/6 C, 24 F, 6 A, 303/6 M, 84 R, 84 A; 188/349, 151 A

[56] References Cited

U.S. PATENT DOCUMENTS

| 4,252,379 | 2/1981 | Falk | 303/6 C |
| 4,458,953 | 7/1984 | Mizusawa et al. | 303/6 C |
| 4,492,411 | 1/1985 | Moriya | 303/6 C |

FOREIGN PATENT DOCUMENTS 55-76733 6/1980 Japan.
2076091 11/1981 United Kingdom.

*Primary Examiner*—Andres Kashnikow
*Assistant Examiner*—Robert J. Oberleitner
*Attorney, Agent, or Firm*—Schwartz, Jeffery, Schwaab, Mack, Blumenthal & Evans

[57] ABSTRACT

In a brake pressure control valve of a double piping system, there is employed a compression spring for biasing the free-piston unit to assume its neutral position, so that even when a pressure difference smaller than a predetermined magnitude is created between the respective inlets of the two proportioning valves, the free-piston unit is prevented from moving from the neutral position, and even if such movement occurs, it is quickly returned to the neutral position by the biasing force of the spring. Thus, rapid self-centering of the free-piston unit is achieved thereby assuring a stable braking of the vehicle.

10 Claims, 3 Drawing Figures

BRAKE PRESSURE CONTROL VALVE OF A DOUBLE PIPING HYDRAULIC BRAKING SYSTEM

BACKGROUND OF THE INVENTION

1. Field of the Invention

The present invention relates in general to a brake pressure control valve for controlling the brake pressure applied to the rear wheels of a motor vehicle, and more particularly to a proportioning valve adapted for use with a double piping type hydraulic braking system.

2. Description of the Prior Art

Various kinds of brake pressure control valves (or proportioning valves) are known which control the brake pressure delivered to the rear wheels of the vehicle so that once the master cylinder pressure reaches a certain value (critical pressure), the brake pressure for the rear wheels thereafter increases at a lesser rate than the input pressure from the master cylinder. With this function, the dangerous skid phenomenon wherein the rear wheels are locked prior to the front wheels under braking of the vehicle is suppressed.

Nowadays, in order to assure safety of the vehicle, a so-called double piping type hydraulic braking system is widely employed, which includes generally two groups of braking systems so that even when one system fails to operate, the braking of the vehicle is assured by the other braking system. X-piping type and J-J piping type are widely known as the double piping braking system.

Thus, when the double piping braking system requires the above-mentioned anti-skid phenomenon, two brake pressure control valves are necessary which are respectively disposed in the two (double) hydraulic lines of the system. Usually, the two control valves (or proportioning valves) are assembled in a single housing from the standpoint of mounting space and vehicle assembly, and some are of a type of so-called back-to-back proportioning valve assembly (which will be referred to as back-to-back proportioning valve, hereinafter) in which two proportioning valves are aligned in the single housing in a mirror image relationship. (One example of this type valve is disclosed in Japanese Patent Application First Publication No. Sho 55-76733). Furthermore, in order to assure safety of the vehicle upon brake trouble, some of the valves have therein a fail-safe system of a free piston type which functins so that when one braking system fails to operate thereby creating a pressure difference between the two braking systems, the free piston means is shifted, due to the pressure difference, from its pressure-balanced neutral (or home) position to a fail-safe position causing the other braking system to brake the vehicle bypassing the associated proportioning valve.

However, some of the back-to-back proportioning valves having the above-mentioned type fail-safe system fail to have a desirable self-centering characteristics of the free piston means. That is, when the brake pedal is rapidly released, there is produced, but for a moment, a prssure difference between the input pressures of the paired proportioning valves causing displacement of the free piston means from its home (neutral) position. However, due to their inherent constructions having unavoidable dimensional errors in production, some of them can not carry out rapid self-centering movement of the free piston means even when the pressure difference disappears thereafter. The rapid self-centering of the free piston means is quite important because if the brake pedal is depressed with the free piston means being not centered, the brake pressures applied to the rear wheels become unbalanced thereby causing unstable braking of the vehicle.

SUMMARY OF THE INVENTION

Therefore, it is an essential object of the present invention to provide a brake pressure control valve of a double piping braking system, which is free of the above-mentioned weak point.

According to the present invention, there is provided an improved brake pressure control valve for a double piping hydraulic braking system. The valve features a housing having a bore formed therein, a pair of substantially identical proportioning valve units coaxially and symmetrically arranged in the bore in back-to-back relationship, each of the proportioning valve unit being constructed to produce, under a certain condition, a controlled outlet hydraulic pressure in accordance with the magnitude of a hydraulic pressure applied thereto, a free-piston unit axially slidably disposed between the paired proportioning valve units so that when the free-piston unit is in its neutral position, each of the proportioning valve units operates normally, and when one piping system associated with one of the proportioning valve units fails to operate, the free-piston unit is moved to a fail-safe position thereby causing the other proportioning valve unit to produce, regardless of the magnitude of the hydraulic pressure applied thereto, an outlet hydraulic pressure which is equal to the hydraulic pressure applied thereto, and biasing means for biasing the free-piston unit to assume the neutral position thereby to prevent the movement of the free-piston unit from the neutral position so long as a force applied to the free-piston unit is smaller than the force produced by the biasing means.

BRIEF DESCRIPTION OF THE DRAWINGS

Other objects and advantages of the present invention will become apparent from the following description when taken in conjunctin with the accompanying drawings, in which.

DETAILED DESCRIPTION OF THE INVENTION

Figure 1:
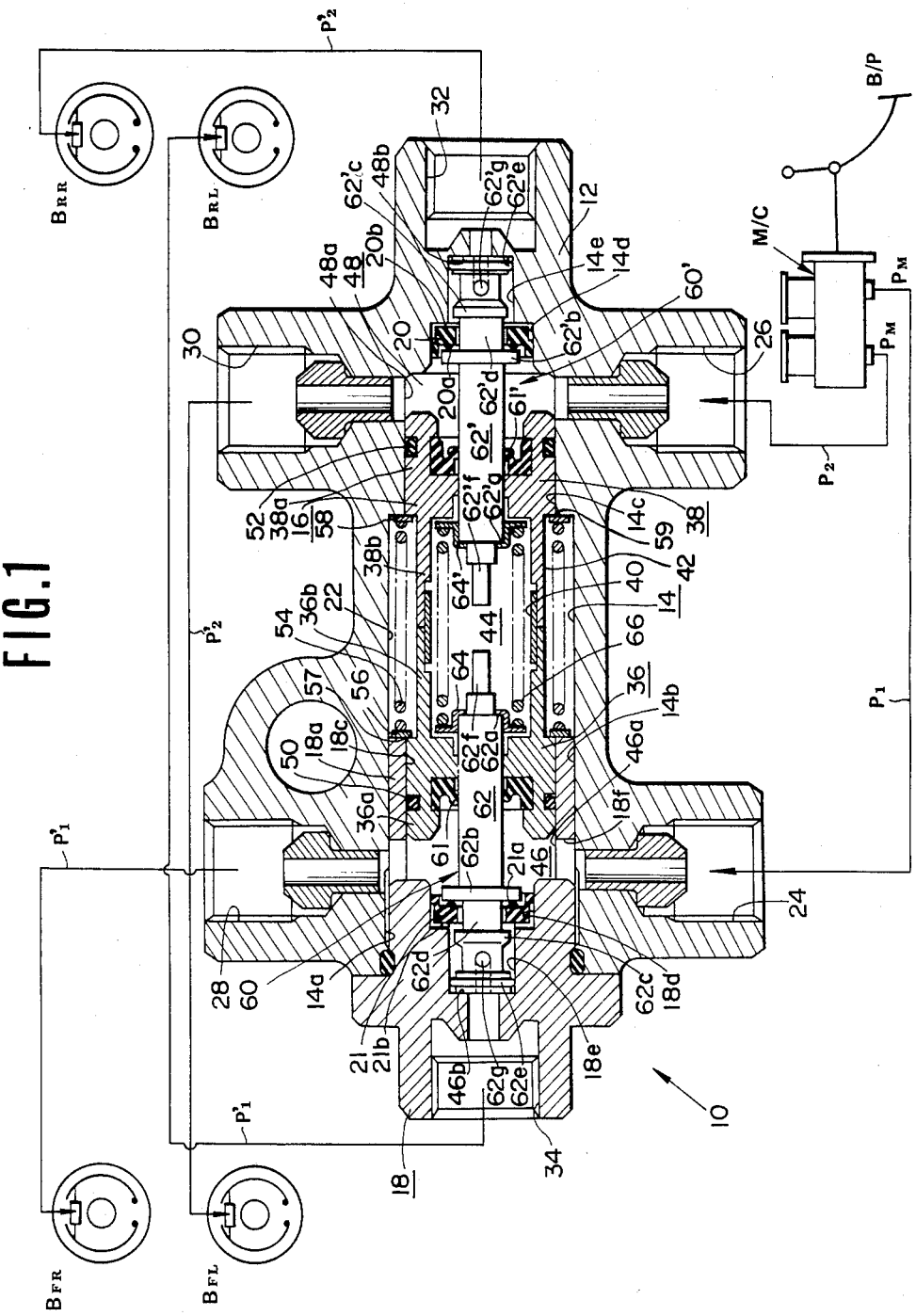
FIG. 1 is a sectional elevational view of a brake pressure control valve of the present invention, showing a normal condition of the valve.
Figure 2:
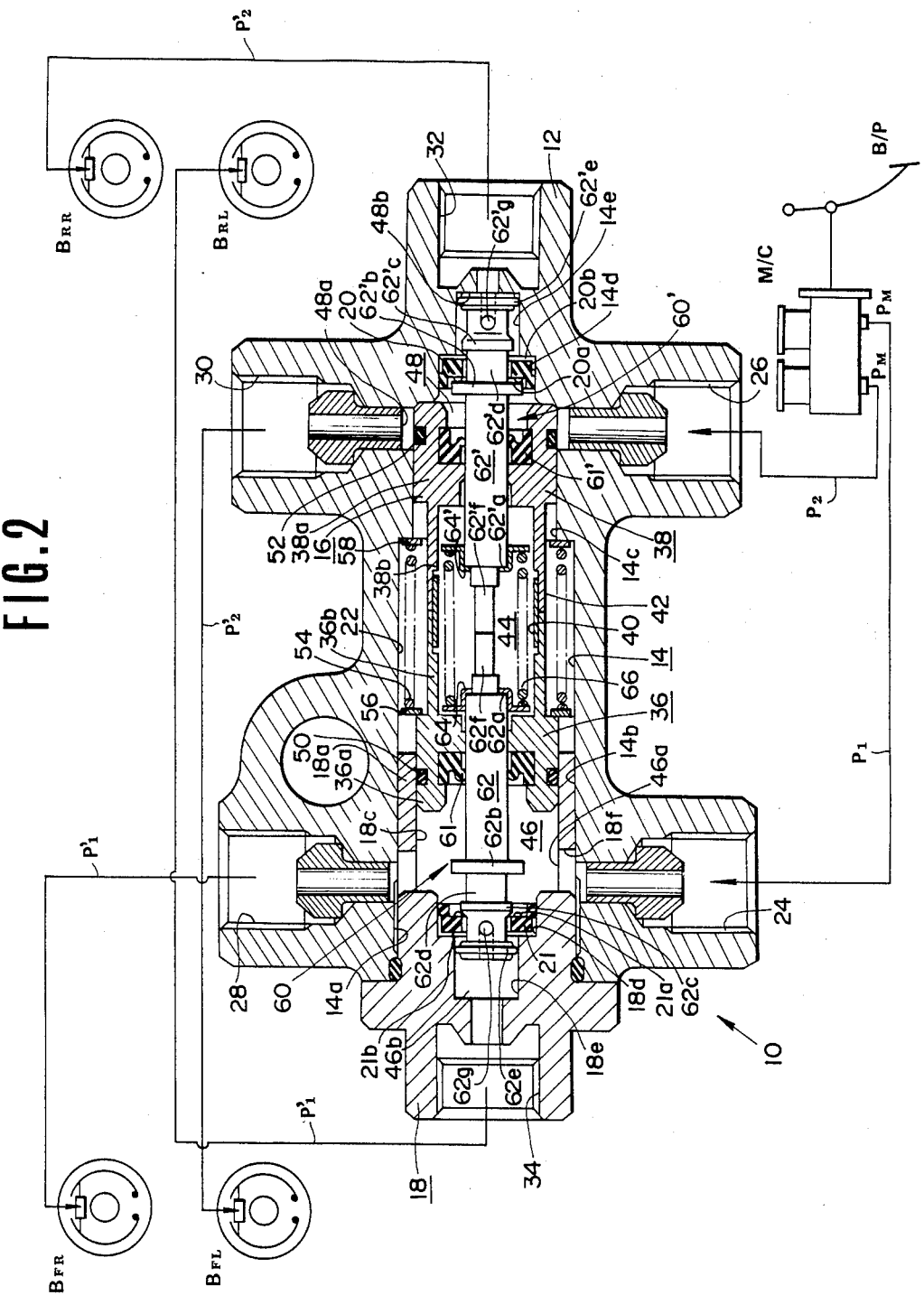
FIG. 2 is a view similar to FIG. 2, but showing an abnormal condition in which one braking system fails to operate.

Referring to FIGS. 1 and 2, particularly FIG. 1, there is shown a brake pressure control valve 10 according to the present invention. As is seen from the drawing, the valve 10 is associated with a diagonally arranged dual piping (X-piping) system including conduit lines $P_1$ and $P_2$ and $P'_1$ and $P'_2$. The two conduit lines $P_1$ and $P_2$ are independent from each other. The lines $P'_1$ $P'_2$ connect one outlet (primary outlet in the illustrated case) of a tandem master cylinder M/C with both a front-right wheel brake cylinder $B_{FR}$ and a rear-left wheel brake cylinder $B_{RL}$, while, the lines $P'_2$ $P'_2$ connect the other outlet (secondary outlet in the illustrated case) of the master cylinder M/C with both a front-left wheel brake cylinder $B_{FL}$ and a rear-right wheel brake cylinder $B_{RR}$, as shown. The tandem master cylinder M/C produces a master cylinder pressure $P_M$ in each outlet when a brake pedal B/P is depressed to a certain degree.

The brake pressure control valve 10 comprises a housing 12 in which a cylindrical bore 14 is defined. Slidably disposed in the cylinderical bore 14 is a free piston unit 16 which will be described in detail hereinafter. As shown, the cylindrical bore 14 comprises first, second, third, fourth and fifth sections 14a, 14b, 14c, 14d and 14e which are arranged in this order from the left end of the bore 14, as viewed in the drawing. The first section 14a is internally threaded. The diameters of the third, fourth and fifth sections 14c, 14d and 14e are smaller than that of the second section 14b and are stepwisely reduced in this order, as shown. A plug 18 is screwed to the threaded first section 14a to close the same. The third section 14c slidably receives therein a right side portion 38a of the free piston unit 16, and the fourth section 14d tightly holds therein an annular lip seal 20 constructed of an elastomeric material, such as rubber. The plug 18 is formed with a tubular portion 18a which is fitted in the second section 14b of the cylindrical bore 14 leaving a space between the rightmost end of the tubular portion 18a and the rightmost stepped end of the second section 14b of the bore 14. With this, a cylindrical mounting space 22 is defined by the inner surface of the second section 14b, the rightmost end of the tubular portion 18a and the rightmost stepped end of the second section 14b. The plug 18 is formed therein with a coaxially arranged stepped bore (no numeral) which comprises larger, medium and smaller sections 18c, 18d and 18e which are arranged in this order from the right end of the tubular portion 18a of the plug 18. The diameters of them 18c, 18d and 18e are equal to those of the third, fourth and fifth sections 14c, 14d and 14e of the bore 14, respectively. The larger bore section 18c of the plug 18 slidably receives therein a left side portion 36a of the free piston unit 16, and the medium bore section 18d tightly holds therein an annular lip seal 21 constructed of an elastomeric material, such as rubber.

The housing 12 is formed with two inlet ports 24 and 26 which are respectively connected to the primary and secondary outlets of the master cylinder M/C through the associated conduit lines $P_1$ and $P_2$, as shown. Furthermore, the housing 12 is formed with three outlet ports 28, 30 and 32 which are respectively connected to the front-right wheel brake cylinder $B_{FR}$, the front-left wheel brake cylinder $B_{FL}$ and the rear-right wheel brake cylinder $B_{RR}$ through the associated conduit lines $P'_1$, and $P'_2$, as shown. Similar to this, the plug 18 is formed with an outlet port 34 which is connected to the rear-left wheel brake cylinder $B_{RL}$ through the associated conduit line $P_1$. The two inlet ports 24 and 26 and the four outlet ports 28, 30, 32 and 34 are open to the cylindrical bore 14 of the housing 12.

The free piston unit 16 comprises two substantially identical parts 36 and 38 which are coaxially aligned in the bore 14 in back-to-back relationship. Each part 36 or 38 has a base cylindrical portion 36a or 38a and a tubular portion 36b or 38b. The two parts 36 and 38 are united by snugly putting their tubular portions 36b and 38b on a common sleeve 40. The united two parts 36 and 38 thus forming the free piston unit 16 have, about the tubular portions 36b and 38b, a cylindrical groove 42 the axial length of which is equal to that of the aforementioned cylindrical mounting space 22. The united parts 36 and 38 form within their tubular portions 36b and 38b a cylindrical bore 44 in which an after-mentioned compression spring 66 is disposed. The base cylindrical portions 36a and 38a are respectively and sealingly slidably received in the larger bore section 18c of the plug 18 and the third bore section 14c of the housing 14 in a manner to define work chambers 46 and 48 at the left and right portions of the bore 14, respectively. The tubular portion 18a of the plug 18 is formed with openings 18f open to the work chamber 46. The left side work chamber 46 is connected with the inlet port 24 and the outlet ports 28 and 34, while, the right side work chamber 48 is connected with the inlet port 26 and the outlet ports 30 and 32. Designated by numerals 50 and 52 are seals disposed about the base portions 36a and 38a of the free-piston unit 16.

Within a cylindrical clearance formed by the space 22 of the housing 12 and the groove 42 of the free piston unit 16, a coil spring 54 is compressed through annular spring seats 56 and 58. Thus, the annular spring seats 56 and 58 are pressed against the opposed ends of the clearance by the spring 54. It is to be noted that the spring 54 biases the free piston unit 16 to assume its reset or neutral position where the annular groove 42 of the unit 16 is registered with the space 22 of the housing 12. That is, each of the opposed ends forms a shoulder 57 or 59 when the respective ends of the space 22 and the groove 42 are registered (FIG. 1), the ends of the spring 54 resting on the shoulders 57, 59 when the free piston is in the neutral position. The biasing force of the spring 54 is so determined as to overcome a certain force which may be created by a possible pressure difference between the outlet pressures of the primary and secondary sections of the master cylinder M/C under normal braking operation. Thus, under normal operating condition of the braking system, the free piston unit 16 is placed at the neutral position as shown in FIG. 1. Thus, the groove 42 of the free piston unit 16, the cylindrical space 22 of the housing 12, the spring 54 and the spring seats 56 and 58 constitute a so-called "free piston neutral position keeper".

At opposed end portions of the bore 14 of the housing 12, there are respectively arranged proportioning valves which are generally designated by numerals 60 and 60'. As will become apparent as the description proceeds, in normal condition, each proportioning valve 60 or 60' controls the hydraulic pressure applied to the rear wheel brake cylinder $B_{RL}$ or $B_{RR}$ in accordance with the magnitude of the pressure produced by the master cylinder M/C.

For facilitation of the description, the following explanation of the proportioning valves 60 and 60' will be made only with respect to the left valve 60. The right valve 60' is substantially the same in construction and configuration as the left valve 60. Thus, for ease of understanding and description, some of the parts of the right valve 60' will be indicated by the addition of the mark " ' " after each corresponding numeral.

The proportioning valve 60 comprises a plunger 62 which is axially movably disposed in the work chamber 46 with its axially spaced sections slidably disposed in bores (no numerals) respectively formed in the annular lip seal 21 (or 20 in the right side proportioning valve 60') and the part 36 of the free piston unit 16 (or the part 38 in the right side proportioning valve 60'). With this, two work chamber sections 46a and 46b are defined in the work chamber 46. (That is, two work chamber sections 48a and 48b are defined in the right side proportioning valve 60'). Designated by numeral 61 is a seal disposed in the part 36 of the free piston unit 16.

The plunger 62 comprises a major portion 62a the leading end of which is projected into the cylindrical bore 44, a larger flange 62b which is contactable with an annular projection 21a (20a in the right side proportioning valve 60') formed on the annular lip seal 21, a smaller flange 62c which is sealingly contactable, in a certain condition, with a seat portion 21b (20b in the right proportioning valve 60') of the lip seal 21, a reduced diameter portion 62d which is defined between the larger and smaller flanges 62b and 62c, and a medium flange 62e which is formed on the leftmost (or rightmost in the right side proportioning valve 60') end of the plunger 62 and is sealingly slidably disposed in the smaller bore section 18e (or 14e in the right side proportioning valve 60') of the plug 18. The leading end of the major portion 62a is provided with a reduced diameter stud 62f which extends toward the counterpart of the right side proportioning valve 60'. As will be apparent hereinafter, the stud 62f acts as a stopper. The plunger 62 has therein a passage 62g which has one end exposed to the space defined by the smaller and medium flanges 62c and 62e and the other end exposed to a conduit (no numeral) open to the oulet port 34 (or 32 in the right side proportioning valve 60') of the plug 18. When, thus, the plunger 62c is in a position where the smaller flange 62c contacts sealingly the lip seal 21 (or 20 in the right side proportioning valve 60'), the above-mentioned two work chamber sections 46a and 46b (or 48a and 48b in the right side proportioning valve 60') are independently defined. Thus, under this condition, the pressure difference between the two work chamber sections 46a and 46b induces a movement of the plunger 62 in either one of the axially opposed directions. A spring seat 64 is secured to the root portion of the stud 62f to move therewith axially in the cylindrical bore 44 of the free piston unit 16.

A coil spring 66 is coaxially disposed or compressed between the spring seats 64 and 64' to bias the two plungers 62 and 62' in the opposed directions, that is, in the directions to move away from each other.

In the following, operation will be described.

In order to facilitate the following description, the explanation of the operation will be commenced with respect to the rest condition of the control valve 10, as is shown in FIG. 1, which is induced when the brake pedal B/P is not depressed. That is, when the master cylinder M/C does not produce the master cylinder pressure $P_M$, the free piston unit 16 assumes its neutral position due to the action of the compression spring 54 which is preloaded, and the plungers 62 and 62' assume their outsidemost positions due to the action of the other compression spring 66 which is preloaded where the larger flanges 62b and 62'b are in contact with the corresponding annular projections 21a and 20a of the lip seals 21 and 20, separating the smaller flanges 62c and 62'c from the corresponding lip seals 21 and 20.

When, now, the brake pedal B/P is depressed to cause the master cylinder M/C to produce at each of the outlets thereof the master cylinder pressure $P_M$, the pressure $P_M$ is directly applied to the work chamber sections 46a and 48a through the conduit lines $P_1$ and $P_2$. The pressure $P_M$ in the work chamber sections 46a and 48a is directly applied to the front-right wheel brake cylinder $B_{FR}$ and the front-left wheel brake cylinder $B_{FL}$ through the respective outlet ports 28 and 30 and the respective outlet conduit lines $P'_1$ and $P'_2$. At the same time, the pressure $P_M$ in the chamber section 46a (or 48a) is directly applied to the rear-left wheel brake cylinder $B_{RL}$ (or the rear-right wheel brake cylinder $B_{RR}$) through the clearance defined between the lip seal 21 (or 20) and the larger flange 62b (or 62'b), the smaller bore section 18e (or 14e), the passage 62g (or 62'g), the outlet port 34 (or 32) and the corresponding outlet conduit line $P'_1$ (or $P'_2$). Accordingly, during this initial braking period, the rear wheel brake pressure increases at the same rate as the master cylinder pressure $P_M$, like the front wheel brake pressure. Thus, under this condition, the four wheels are applied with substantially equal braking forces from the associated brake cylinders. Under this condition, the free piston unit 16 keeps its neutral position because of non-pressure difference between the work chamber sections 46a and 48b.

When, due to further depression of the brake pedal B/P, the master cylinder pressure $P_M$ increases to such a degree that the force for moving the two plungers 62 and 62' toward each other exceeds the biasing force F of the compression spring 66, the plunges 62 and 62' are actually moved toward each other against the force F of the spring 66 and assume their insidemost positions where the smaller flanges 62c and 62'c are sealingly in contact with the seat portions 21b and 20b of the lip seals 21 and 20, separating the larger flanges 62b and 62'b from the annular projections 21a and 20a of the corresponding lip seals 21 and 20. That is, in this condition, each plunger 62 or 62' is applied with the hydraulic pressure in the work chamber 46a or 48a, the hydraulic pressure in the other work chamber 46b or 48b and the biasing force of the compression spring 66, so that, thereafter (that is, after the split point), under the influence of the above-mentioned pressures and biasing force, the brake pressure $P_R$ applied to the rear wheel brake cylinders $B_{RL}$ and $B_{RR}$ increases at a lesser rate than the brake pressure $P_F$ (or the master cylinder $P_M$) applied to the front wheel brake cylinders $B_{FR}$ and $B_{FL}$. Thus, in this condition, the braking force applied to the rear wheels is lesser than that applied to the front wheels thereby preventing the dangerous skid phenomenon of the vehicle. For the same reason as mentioned hereinabove, the free-piston unit 16 is kept in the neutral position under this condition.

Figure 3:
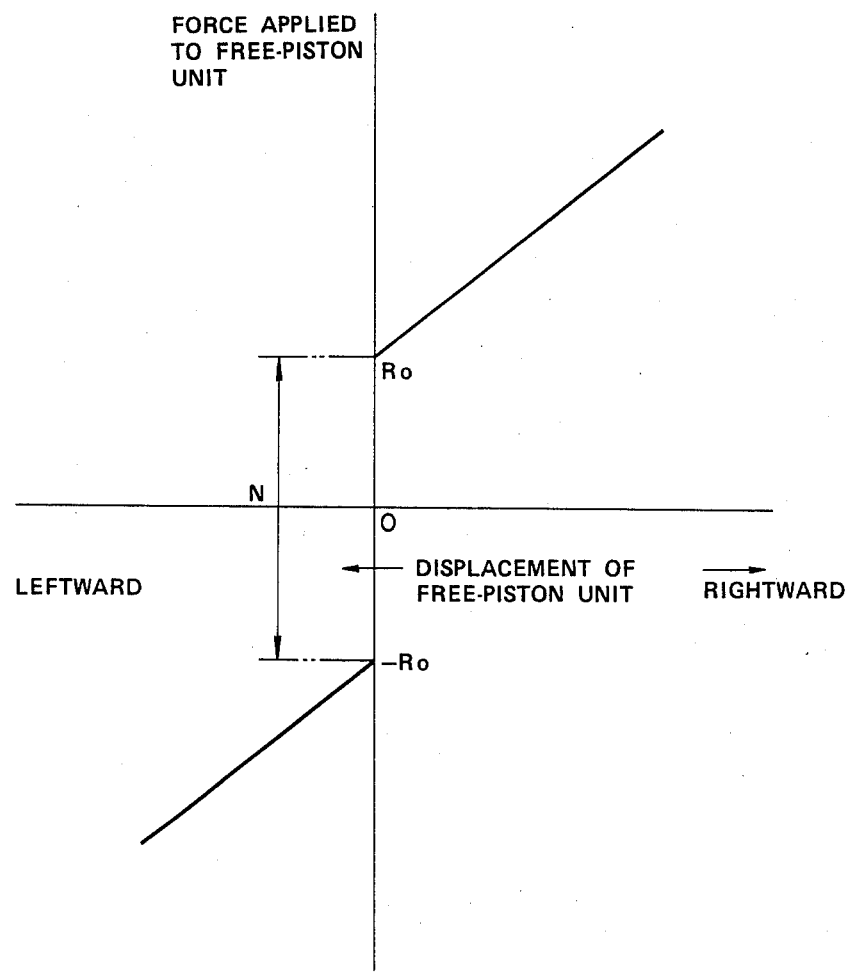
FIG. 3 is a graph showing the pressure control characteristics of the valve of the present invention.

When, one braking system, for example, the system associated with the conduit lines $P_2$ $P'_2$, fails to operate, the free piston unit 16 is moved rightward (in FIG. 1) against the biasing force of the spring 54 due to the pressure lack in the work chamber section 48a and assumes its rightmost position as shown in FIG. 2. It is to be noted that the spring 54 is constructed and designed to assure the above-mentioned compression when one braking system fails to operate. This phenomenon will be understood from the graph of FIG. 3 which shows the relationship between the displacement of the free-piston unit 16 from the neutral position and the force applied thereto under braking operation. During the rightward movement of the free piston unit 16, the left side plunger 62 is moved by the unit 16 rightward and stops at the position where the stud 62f of the plunger 62 abuts with the stud 62'f of the right side plunger 62', as is seen from FIG. 2. It is to be noted that during the above-mentioned rightward movement, the smaller flange 62c of the left side plunger 62 is thrusted in the opening of the lip seal 21 and finally exposed to the work chamber section 46a thereby connecting the work chamber section 46a and the other work chamber section 46b by the passage 62g of the plunger 62. Thus, when the braking system associated with the conduit lines P'₂ P'₂ fails to operate and thus the free piston unit 16 and the plunger 62 assume their rightmost positions as is described hereinabove, the rear-left wheel brake cylinder $B_{RL}$ is applied with the master cylinder pressure $P_M$ directly, as well as the associated front-right wheel brake cylinder $B_{FR}$. That is, under this fail-safe condition, the master cylinder pressure $P_M$ at the work chamber section 46a is directly applied to the rear-left wheel brake cylinder $B_{RL}$ through the clearance defined between the plunger 62 and the lip seal 21, the passage 62g of the plunger 62, the outlet port 34 and the conduit line P₁, without being controlled in pressure. Thus, in this condition, substantially sufficient and equal braking forces are applied to the rear-left wheel and the front-right wheel, resulting in fail-safe operation of the pressure control valve 10 of the invention. It is to be noted that if the other braking system fails to operate, substantially the same fail-safe operation is carried out.

When, due to some reasons such as those as mentioned hereinafter, a small pressure difference is created between the two inlet ports 24 and 26 and thus between the work chambers 46a and 48a, that is, for example, when the pressure in the chamber section 46a (see FIG. 1) becomes lower than that in the other chamber section 48a, the free-piston unit 16 is applied with a certain biasing force corresponding to the pressure difference therebetween. However, the free-piston unit 16 is suppressed from movement due to the biasing force generated by the compression spring 54, so that the unit 16 keeps its neutral position. Even if the free-piston unit 16 moves leftward due to the pressure difference, it is returned quickly to the neutral position by the action of the spring 54. Of course, the spring 54 is constructed and compressed so as to carry out the above-mentioned operation. This advantageous phenomenon, that is a quick self-centering characteristics of the free-piston unit 16, will be understood from the graph of FIG. 3. That is, by the presence of the spring 54 which is preloaded, the free-piston unit 16 has a so-called "inoperative zone" wherein it does not move even when applied with a biasing force. In other words, the free-piston unit 16 does not move so long as the baising force created by the pressure difference between the work chambers 46a and 48a is smaller than the biasing force of the spring 54. Thus, within such zone, the pressure control valve 10 of the invention carries out the normal pressure control. This self-centering movement of the free-piston unit 16 is also carried out when the pressure in the work chamber 48a is lower than that in the work chamber 46a.

As is described hereinabove, in the pressure control valve 10 according to the present invention, there is employed biasing means 54 for biasing the free-piston unit 16 to assume its neutral position, so that even when a small pressure difference is created between the respective inlets of the two proportioning valves, the free-piston unit 16 is prevented from displacement from the neutral position, and even if such movement occurs, it is quickly returned to the neutral position by the biasing force. In short, in the present invention, the rapid self-centering of the free piston unit is achieved thereby assuring the stable braking of the vehicle.

What is claimed is:

1. A brake pressure control valve for a double piping hydraulic braking system, comprising:
   a housing having a bore formed therein;
   two substantially identical proportioning valve units coaxially and symmetrically arranged in said bore in back-to-back manner, each unit having a plunger and being constructed to produce, under a certain condition, a controlled outlet hydraulic pressure in accordance with the magnitude of a hydraulic pressure applied thereto;
   a first biasing spring compressed between the respective plungers of the two valve units in a manner to bias the plungers away from each other;
   a free-piston unit comprising two free-piston parts connected to each other to move together, said unit being axially and slidably disposed in said bore between the two proportioning valve units so that when said free-piston unit is in its neutral position relative to said housing, each unit operates normally, and when one piping system associated with one of said proportioning valve units fails to operate, both piston parts of the free-piston unit move together as a unit and are moved relative to the housing to a fail-safe position to cause the other proportioning valve unit to produce, regardless of the magnitude of the hydraulic pressure applied thereto, an outlet hydraulic pressure which is equal to the hydraulic pressure applied thereto; and
   a second biasing spring operative between said free-piston unit and said housing, said second biasing spring biasing said free-piston unit with a predetermined force against movement from said neutral position relative to said housing so as to prevent the movement of said free-piston unit from the neutral position so long as an external force applied to said free-piston unit is smaller than the predetermined force produced by said second biasing spring.

2. A brake pressure control valve as claimed in claim 1, in which said second biasing spring is compressed to bias the free-piston unit to assume said neutral position.

3. A brake pressure control valve as claimed in claim 2, further including a cylindrical groove formed in the outer surface of a tubular portion of the free-piston unit, a mounting space formed in a cylindrical inner surface of said bore of said housing and having an axial length which is equal to that of said cylindrical groove; and spaced two spring seats disposed in a cylindrical clearance comprised of said cylindrical groove and said mounting space in a manner to put therebetween said second biasing spring under compression.

4. A brake pressure control valve as claimed in claim 3, in which said free-piston unit comprises a pair of substantially identical parts which are coaxially aligned in the bore in back-to-back relationship.

5. A brake pressure control valve as claimed in claim 4, in which each part of said free-piston unit comprises a base cylindrical portion and a tubular portion, and in which the two parts are united by snugly putting their tubular portions on a common sleeve.

6. A brake pressure control valve as claimed in claim 5, in which said base cylindrical portion of each part of said free-piston unit has therein a bore through which a plunger of one of said proportioning valve units passes.

7. A brake pressure control valve as claimed in claim 6, in which the facing ends of said plungers are respectively provided with coaxially extending studs which are spaced from each other when said free-piston unit assumes the neutral position.

8. A brake pressure control valve as claimed in claim 7, in which said studs are brought into contact with each other when said free-piston unit is moved to said fail-safe position due to the operation failure of one piping system.

9. A brake pressure control valve as claimed in claim 8, in which a seal is connected to said base cylindrical portion of each part of the free-piston unit in order to assure oil sealing between the plunger and the associated base cylindrical portion.

10. A brake pressure control valve as claimed in claim 9, in which each plunger extends longitudinally in a work chamber defined by said bore and has a pressure control construction by which said work chamber is partitioned into two work chamber sections, one section communicating constantly with the inlet opening of the corresponding proportioning valve unit, the other section communicating constantly with the outlet opening of the same.

* * * * *